United States Patent
Alharbi et al.

(10) Patent No.: US 11,284,970 B1
(45) Date of Patent: Mar. 29, 2022

(54) FIXED SPACE REGAINER

(71) Applicant: KING SAUD UNIVERSITY, Riyadh (SA)

(72) Inventors: Mohammed Murshed Alharbi, Riyadh (SA); Nawal Murshed Alharbi, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 16/905,841

(22) Filed: Jun. 18, 2020

(51) Int. Cl.
*A61C 8/00* (2006.01)
*A61C 5/80* (2017.01)
*B33Y 70/00* (2020.01)
*B33Y 80/00* (2015.01)
*C08F 20/14* (2006.01)
*A61C 8/02* (2006.01)

(52) U.S. Cl.
CPC .............. *A61C 8/0006* (2013.01); *A61C 5/80* (2017.02); *B33Y 70/00* (2014.12); *B33Y 80/00* (2014.12); *C08F 20/14* (2013.01)

(58) Field of Classification Search
CPC ................................ B33Y 70/00; B33Y 80/00
See application file for complete search history.

(56) References Cited

U.S. PATENT DOCUMENTS

| 3,525,153 | A | 8/1970 | Gerber |
| 6,964,566 | B2 | 11/2005 | Sapian |
| D638,129 | S | 5/2011 | Inman |
| D738,513 | S | 9/2015 | Coreil |
| 9,339,351 | B2 | 5/2016 | Durandis |
| 2019/0142557 | A1* | 5/2019 | Bartelli ................ A61C 13/082 433/203.1 |

FOREIGN PATENT DOCUMENTS

DE 4142308 A1 7/1993

OTHER PUBLICATIONS https://www.protecdental.com/sites/default/files/2014%20Valpast.pdf (Year: 2014).*
https://www.aegisdentalnetwork.com/news/2015/04/7/Valplast-Unveils-3D-Printable-Resin (Year: 2015).*

(Continued)

*Primary Examiner* — Vu A Nguyen
(74) *Attorney, Agent, or Firm* — Nath, Goldberg & Meyer; Richard C. Litman

(57) ABSTRACT

The fixed space regainer is a resin band designed to regain space in the gap between the remaining teeth when a tooth is lost. The band has opposing concave ends that provide bonding surfaces or anchors that attach to the remaining teeth on opposite sides proximal to the gap and an elongate connecting band between the bonding surfaces. The regainer is made from a biocompatible elastic material so that the connecting band will arch when installed across the gap and exert resilient pressure against the remaining teeth proximal to the gap to regain the space lost by narrowing that occurs by loss of the tooth, thereby providing proper spacing for growth of a permanent tooth or installation of a cosmetic replacement. The regainer may be designed by the dentist in software from a digital impression and made by 3D printing or additive manufacturing.

4 Claims, 2 Drawing Sheets

(56) References Cited

OTHER PUBLICATIONS https://3dprint.com/150237/arfona-valplast-rpod-dentures/ (Year: 2016).*
Rane Jaai et al., "Space Regainers—A Review", European Journal of Biomedical and Pharmaceutical Sciences (2018), vol. 5, Iss. 7, 212-217.
Javaid et al., "Current status and applications of additive manufacturing in dentistry: A literature-based review", Journal of Oral Biology and Craniofacial Research (2019), vol. 9, pp. 179-185.

* cited by examiner

US 11,284,970 B1

FIXED SPACE REGAINER

BACKGROUND

1. Field

The disclosure of the present patent application relates to dental appliances, and particularly to a fixed space regainer for regaining space between remaining teeth when one or more teeth are lost, the regainer being made by 3D printing or additive manufacturing.

2. Description of the Related Art

Patients who present with loss of a tooth are a common occurrence in dental offices. Pediatric dentists commonly see children who have lost one or more of their primary or "baby" teeth and are waiting for the tooth or teeth to be replaced by permanent teeth. Similarly, adults may experience loss of a tooth and must wait for a denture or tooth implant to be fabricated to replace the lost tooth, often for cosmetic reasons. When a tooth is lost, there can be loss of arch length, arch perimeter, and arch circumference or other pathological conditions that result in narrowing of normal spacing between the remaining teeth. A variety of devices and dental appliances are available to try to maintain normal alignment or regain the space lost by narrowing, including braces, transparent aligners, mechanical metal appliances (such as metal coil springs), rubber bands, etc. However, such devices are often expensive, require making molds that can be sent to laboratories for fabricating the devices, require replacement to adjust for changes in the alignment of the teeth, or present a poor cosmetic appearance.

Thus, a fixed space regainer solving the aforementioned problems is desired.

SUMMARY

The fixed space regainer is a resin band designed to regain space in the gap between the remaining teeth when a tooth is lost. The band has opposing concave ends that provide bonding surfaces or anchors that attach to the remaining teeth on opposite sides proximal to the gap and an elongate connecting band between the bonding surfaces. The regainer is made from a biocompatible elastic material so that the connecting band will arch when installed across the gap and exert resilient pressure against the remaining teeth proximal to the gap to regain the space lost by narrowing that occurs by loss of the tooth, thereby providing proper spacing for growth of a permanent tooth or installation of a cosmetic replacement. The regainer may be designed by the dentist in software from a digital impression and made by 3D printing or additive manufacturing.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The fixed space regainer is a resin band designed to regain space in the gap between the remaining teeth when a tooth is lost. The band has opposing concave ends that provide bonding surfaces or anchors that attach to the remaining teeth on opposite sides proximal to the gap and an elongate connecting band between the bonding surfaces. The regainer is made from a biocompatible elastic material so that the connecting band will arch when installed across the gap and exert resilient pressure against the remaining teeth proximal to the gap to regain the space lost by narrowing that occurs by loss of the tooth, thereby providing proper spacing for growth of a permanent tooth or installation of a cosmetic replacement. The regainer may be designed by the dentist in software from a digital impression and made by 3D printing or additive manufacturing.

Figure 1:
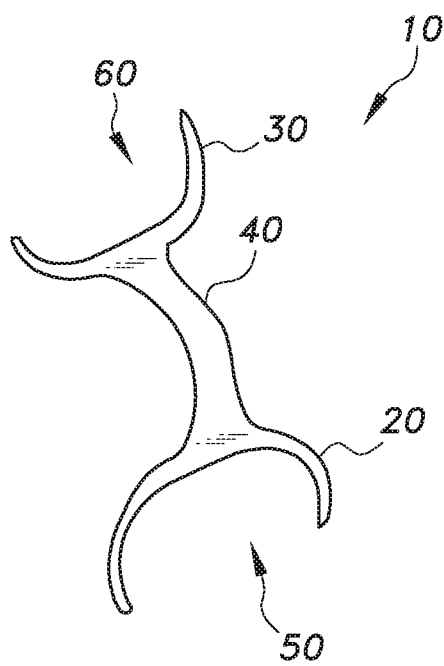
FIG. 1 is a perspective view of a fixed space regainer, shown flexed for insertion in the gap between remaining teeth after loss of one or more teeth.
Figure 2:
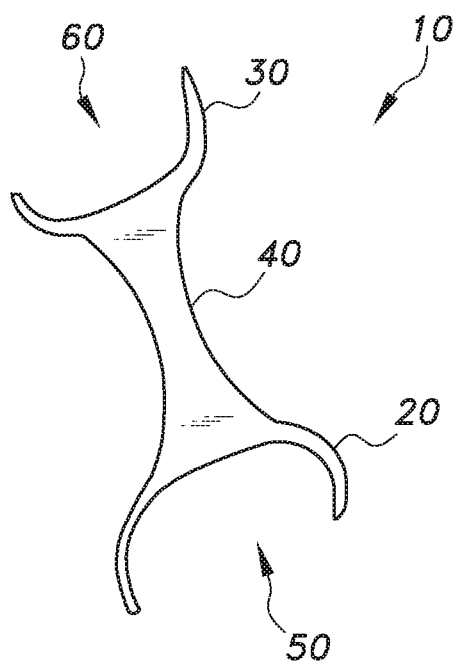
FIG. 2 is a perspective view of a fixed space regainer, shown in a relaxed, flat state.

FIGS. 1 and 2 show an exemplary fixed space regainer 10 having opposing concave ends 20, 30 joined by a connecting band 40 extending between the ends 20, 30. The concave openings 50, 60 or recesses defined in the ends 20, 30, respectively, define bonding surfaces or anchors adapted for attachment to the remaining teeth proximal to the gap formed by the loss of one or more teeth. The curvature of the concave ends 20, 30 is such that the bonding surfaces extend up to one-half the corresponding proximal tooth surface. The connecting band 40 is elongate, having a length slightly longer than the existing space and equal to the planned needed space to remain after regaining the space lost by narrowing after the loss of the intervening tooth or teeth. FIG. 1 shows the regainer 10 flexed or arched for initial insertion between the remaining teeth, and FIG. 2 shows the regainer 10 in a flat, relaxed state, without any compressive force applied to the opposing ends 20, 30.

Figure 3:
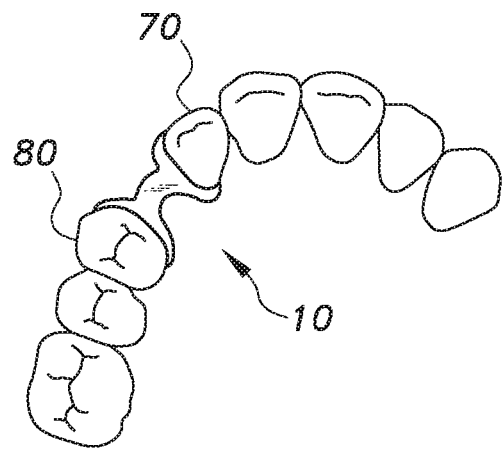
FIG. 3 is an environmental perspective view of a fixed space regainer, shown after initial insertion in the gap between remaining teeth after loss of one or more teeth.
Figure 4:
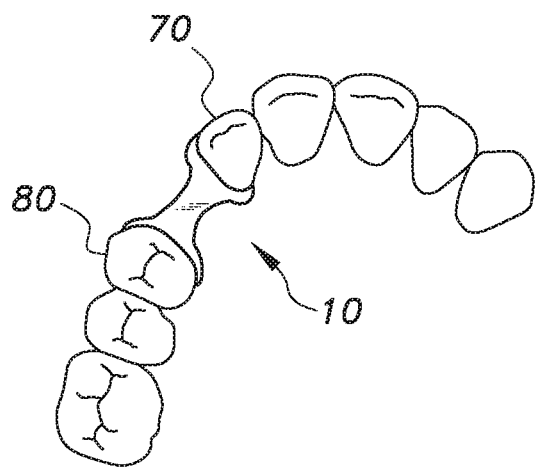
FIG. 4 is an environmental perspective view of a fixed space regainer, shown in a relaxed, flat state in the gap between remaining teeth after loss of one or more teeth after regaining the lost space between the teeth.
Figure 5:
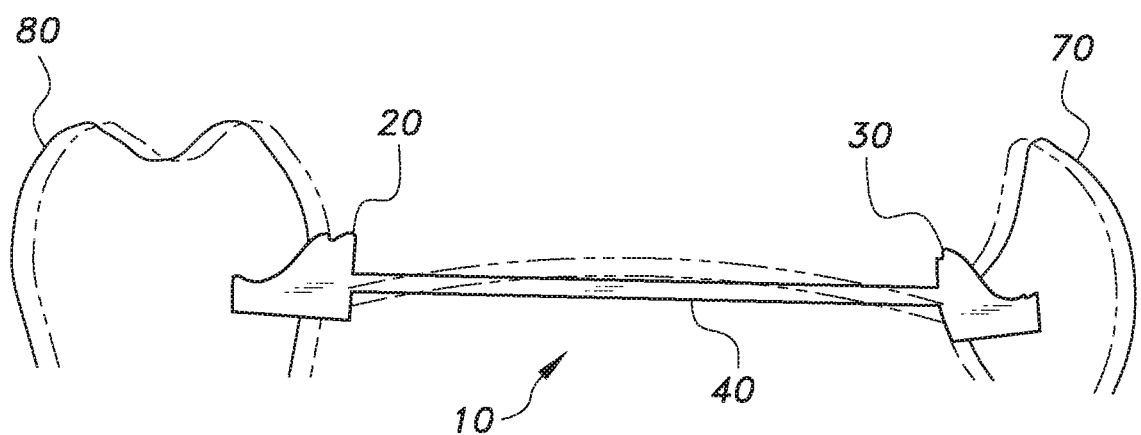
FIG. 5 is an environmental side view of a fixed space regainer, shown in solid lines in a relaxed, flat state in the gap between remaining teeth after loss of one or more teeth after regaining the lost space between the teeth and in phantom lines arched between the teeth before regaining the space.

FIG. 3 shows the fixed space regainer 10 flexed or arched between the proximal remaining teeth 70, 80 by elastic tension during an early stage of the period of regaining the space lost by narrowing the gap formed by loss of the tooth between the proximal teeth 70, 80, and FIG. 4 shows the regainer 10 returning to its relaxed, flat state after the proximal teeth 70, 80 have been moved to the desired degree of separation. FIG. 5 is a side view showing a comparison of the spacing between the proximal teeth 70, 80 and the curvature of the connecting band 40 before and after regaining the lost space. The length of the connecting band 40 is calculated with attention to the elastic modulus of the material from which the regainer 10 is made so that the period of regaining the lost space between the teeth 70, 80 is gradual in order to avoid rotation or excessive torsion being applied to the proximal teeth 70, 80.

The fixed space regainer 10 may be made from any biocompatible elastic material conventionally used in making dental appliances, particularly polymer composite resins, such as PMMA poly (methyl methacrylate). Preferably the regainer 10 is made by 3D printing or additive manufacturing. Suitable 3D printers include 3D printers made or marketed by NextDent, Formlabs, ADMAtec, 3D-systems, EOS, ASIGA, and DWS. Suitable resins include NextDent provisional PMMA-based composite resins, DWS provisional materials, etc. The regainer 10 may be made from dental impressions using any suitable CAD software to make drawings moving the teeth proximal to the gap to the desired new locations, drawing the regainer 10 to a length suitable to bridge the gap (allowing for the modulus of elasticity of the material used for 3D printing) and using a 3D printer to make the regainer 10 directly from the software design, without the necessity of a physical model or mold. It is envisioned that the dentist may make the regainer 10 in his or her office or dental clinic, if equipped with a 3D printer, without the necessity of using an outside dental laboratory. The regainer 10 may then be installed in the patient's mouth and left in place for a period between two weeks and three months, during which time the necessary space for growth of a permanent replacement tooth or for a denture or tooth implant may be gradually regained.

It is to be understood that the fixed space regainer is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A fixed space regainer, consisting of an elongated resilient band consisting of:

opposing ends having concave recesses defining a lateral extent that provides bonding surfaces adapted for attachment only to teeth proximal on opposite sides of a gap formed by loss of at least one tooth, wherein the concave recesses are dimensioned and configured to extend up to one-half the peripheral surface of a corresponding attached tooth; and an elongate connecting band extending between the opposing ends, the band having a width and possesses sufficient elasticity to flex and arch between the proximal teeth on opposite sides of the gap and exert gradual elastic pressure against the proximal teeth to regain space lost by narrowing of the gap, wherein the width is less than the lateral extent of each of the concave recesses.

2. The fixed space regainer according to claim 1, wherein the resilient band is made from a biocompatible polymer composite material.

3. The fixed space regainer according to claim 1, wherein the resilient band is made from a poly (methyl methacrylate)-based composite material.

4. The fixed space regainer according to claim 3, wherein the resilient band is made by 3D printing.

\* \* \* \* \*